May 30, 1933.   C. C. BALDWIN   1,911,665
THRESHING MACHINE
Filed Feb. 17, 1930   2 Sheets-Sheet 1

INVENTOR
Curtis C. Baldwin
Thos. E. Scofield
ATTORNEY

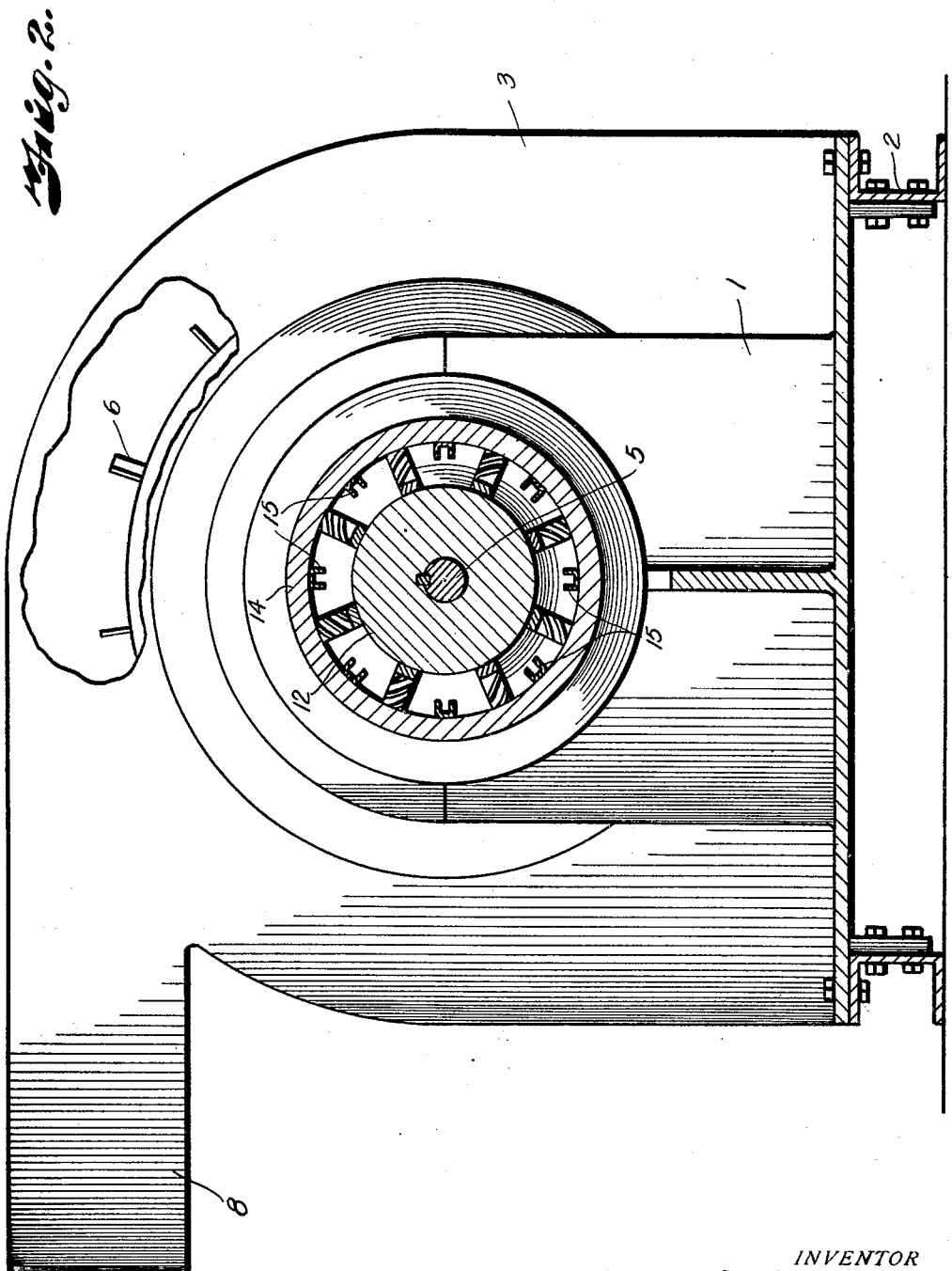

Patented May 30, 1933

1,911,665

UNITED STATES PATENT OFFICE

CURTIS C. BALDWIN, OF WICHITA, KANSAS, ASSIGNOR, BY MESNE ASSIGNMENTS, TO CURTIS HARVESTERS, INC., OF NORTH KANSAS CITY, MISSOURI, A CORPORATION OF MISSOURI

THRESHING MACHINE

Application filed February 17, 1930. Serial No. 429,044.

This invention relates to improvements in threshing machines and refers more particularly to an improved type of centrifugal threshing machine, preferably adapted to be mounted in connection with a combine harvester in which the grain is cut and transferred from the harvester mechanism and passed through the threshing mechanism, after which the separation of the grain from the chaff and straw is made by centrifugal separation together with a suction air draft which facilitates the removal of the straw and chaff from the grain kernels.

It is recognized that it has been common practice heretofore to thresh grain by means of a rasp cylinder. It has also been known to separate grain from the straw and chaff by means of centrifugal separation, but to effectively feed the grain at a proper rate to a tapered rasp type threshing cylinder and subsequently to impart a centrifugal force or movement to the grain and chaff to effect proper separation, is considered to be new practice. Furthermore, after imparting this centrifugal force to the grain and chaff, to introduce an auxiliary air supply to pass in an opposed direction to the grain and chaff by means of which a selective separation of the grain from the chaff is effected is also thought to be novel practice.

Fig. 2 is a view taken along the line 2—2 in Fig. 1, looking in the direction of the arrows.

Figure 1:
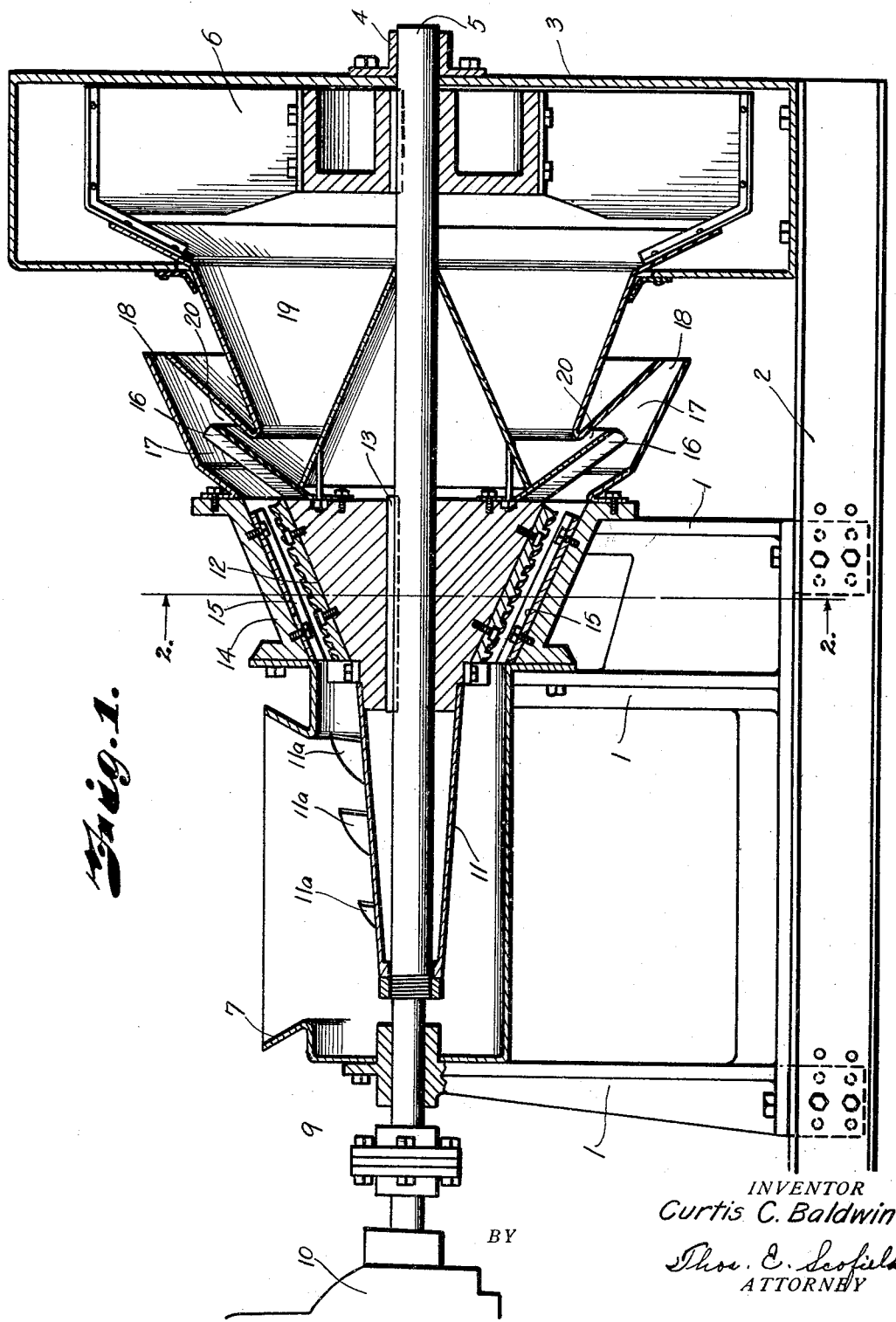
Fig. 1 is a vertical section of a centrifugal threshing and separating machine.

Referring to the drawings; upon suitable standards 1, carried by a main frame 2, is mounted the machine, the main frame supporting not only the standards but also a fan housing 3 which carries in a bearing 4 a shaft 5. Mounted on the shaft 5 is a fan 6 for producing or creating an air draft from the hopper 7 through the entire machine to the exhaust or discharge duct 8 shown in Fig. 2. The fan shaft is directly connected by means of a coupling 9 to a source of power diagrammatically shown at 10. There is also mounted on the shaft 5, below the hopper 7, a feed cone 11 which carries a plurality of impellers 11a, located to form a spiral and increasing in height toward the threshing cylinder 12, which is also mounted upon the shaft 5 immediately adjacent the feed cone.

This threshing cylinder consists of a tapered rasp cylinder, it being different from the well known common type of rasp cylinder having generally a cylindrical form. Also the threshing operation is accomplished somewhat differently as the grain is passed in a direction parallel to the axis of the cylinder in the tapered type while in the cylindrical type the grain is passed between the cylinder and concave in a direction at right angles to the axis of the cylinder. Obviously, with the tapered type cylinder, the entire periphery is used for threshing while only a portion or sector of the periphery is used with the cylindrical type.

The cylinder is fastened to the shaft by means of a key 13. Adjacent the rasp cylinder is a concave 14 having mounted upon its surface a plurality of channel members 15, arranged to lie parallel to the tapered surface of the rasp cylinder. The tapering of the rasp cylinder, together with the spiral form of the teeth on the surface of the rasp cylinder, imparts a high velocity to the grain as it passes over the cylinder during the threshing operation. On being discharged from the rasp cylinder the grain seeks the inner cone-shaped surface of passageway 17, while the straw and chaff, being lighter in weight, follow the air currents through passage 20 which substantially reverses its direction at or near the discharge end of the threshing cylinder. Affixed to the cylinder 12 is a cone 16 upon which are mounted a plurality of vanes 16 positioned directly in the discharge pasageway from the threshing cylinder. These vanes, together with the cylinder, cause the air stream set up by the fan to follow a spiral course, and stimulate the rotary and centrifugal force applied to the air stream and materials. Thus, as suggested, the heavier grain clings to the outer surfaces of the discharge passageway 17, the kernels leaving the machine through an annular discharge port 18.

The fan creating a vacuum in the chamber 19 not only assists the feed cone and its impellers 11a in drawing the grain through the threshing stage, but also draws an auxiliary air blast through the annular discharge passage 18 through which the grain is discharged. The auxiliary air stream, acting with the main air stream, draws with it the straw and chaff, effecting a separation adjacent this discharge port, of the straw and chaff from the grain kernels. This auxiliary air current substantially sweeps clean of chaff and straw the grain clinging to the surface of the passageway 17. The separation of the grain kernels from the chaff and straw takes place in the passageway 17, the kernels of grain passing out through the annular discharge port 18 and the straw and chaff being drawn back by the air suction through the reverse passageway 20 into the chamber 19. The straw and chaff are then picked up by the fan and discharged through the duct 8 shown in Fig. 2.

Actual tests made on this machine show that an effective separation of the grain kernels from the chaff and straw can be made, there being less than one-half of one per cent grain kernels in the resultant waste discharged through the duct 8. Furthermore, it has been established that the grain can be fed more evenly and threshed at a more rapid rate in a tapered threshing cylinder of this character. The machine eliminates a multiplicity of conveyors and chutes, and parts necessary in the usual type of thresher used in connection with combine harvesters.

It is appreciated that the design of the means for setting up the centrifugal motion, as well as the design of the cylinder itself and the feeding mechanism can be varied without departing from the spirit of the invention. The salient features of novelty of the invention lie primarily in the type of feed mechanism for advancing the grain into the threshing cylinder; the special shaped threshing cylinder; and the means for imparting centrifugal force to the materials and spiral movement of the air currents at high velocity to effect separation.

The entire mechanism is rigidly mounted on a single shaft, eliminating the loss in power attending all other type of threshing and separating assemblies using chains and belt drive for the propelling of the separate portions of the apparatus. Furthermore, an advantage of the mechanism is its simplicity, compactness and manufacturing cost relative to the threshing mechanisms now in use.

I claim as my invention:

A combined threshing and separating machine including in combination a circular sectional housing having a feed entrance axial at one end thereof and a straw discharge at the opposite end, a rotatable threshing element in said housing adjacent the feed end, a substantially conical centrifugal impeller member in said housing and axially spaced with respect to said threshing element, and a suction fan at the discharge end of the housing, said housing having spaced overlapping sections forming an annular passageway, said sections being spaced in radial alignment with the surface of said impeller member whereby said impeller will project the threshed grain through said passage against the suction created by said fan to effect a separation of grain from chaff.

In testimony whereof I affix my signature.

CURTIS C. BALDWIN.